United States Patent [19]
Ohmori

[11] Patent Number: 5,907,732
[45] Date of Patent: May 25, 1999

[54] PRESSURE PLATE SPRING

[75] Inventor: Toshiyuki Ohmori, Saitama-ken, Japan

[73] Assignee: Asahi Kogaku Kogyo Kabushiki Kaisha, Tokyo, Japan

[21] Appl. No.: 09/080,211

[22] Filed: May 18, 1998

[30]     Foreign Application Priority Data

May 21, 1997  [JP]  Japan .................................. 9-131510

[51] Int. Cl.⁶ .............................................. G03B 17/24
[52] U.S. Cl. ........................................................ 396/442
[58] Field of Search ................................... 396/440, 441, 396/442

[56]         References Cited

U.S. PATENT DOCUMENTS 4,457,607  7/1984  Sekine et al. ............................ 396/440
5,257,054  10/1993  Kameyama .............................. 396/442

*Primary Examiner*—David M. Gray
*Attorney, Agent, or Firm*—Greenblum & Bernstein P.L.C.

[57]         ABSTRACT

Four spring legs are integrally formed around a flat plate portion of a pressure plate spring such that these four spring legs extend in a clockwise direction seen from the center of the flat plate portion. Hooks engaged with hook engaging portions formed on the rear face of a pressure plate are integrally formed at end tips of the respective spring legs.

7 Claims, 5 Drawing Sheets

PRESSURE PLATE SPRING

BACKGROUND OF THE INVENTION

1. Field of the Invention

The present invention relates to a pressure plate spring for biasing a pressure plate attached to a rear cover of a camera. The present disclosure related to subject matter contained in Japanese Patent Application No. 9-131510 (filed on May 21, 1997), which is expressly incorporated herein by reference in its entirety.

2. Description of the Related Art

In a conventional 35 mm film camera, etc., a pressure plate is arranged on the inner face of a rear cover of the camera to press a film against a film guide rail arranged within the camera. To bias the pressure plate against the film guide rail, a pressure plate spring which is a kind of leaf spring is arranged between the pressure plate and the rear cover. Recently, there is a case in which a photo reflector for detecting a perforation of the film is arranged in the rear cover to obtain information with respect to existence and a moving amount of the film. In this case, the photo reflector is generally arranged in a manner that it faces the film through a notch portion formed in a corner of the pressure plate.

FIG. 8 is a schematic view showing one example of the rear cover 100 into which such a photo reflector 150, the pressure plate 120 and the pressure plate spring 130 are assembled. FIG. 8 shows the rear cover 100 seen from an inner side. In FIG. 8, the running direction (hereinafter, called a film running direction 1) of an unillustrated film at the time when the rear cover 100 is closed is shown by a chain line 1.

As shown in FIG. 8, guide frames 101, 102 are respectively projected along the film running direction 1 in the vicinity of center of upper and lower edges of the inner face of the rear cover 100. In the vicinity of respective both end portions of these guide frames 101, 102, restricting claws 101a, 101b, 102a, 102b are integrally formed in such a manner that these claws are projected toward the opposite guide frames 102, 101 and that clearances of sufficient distance are put between these claws and the inner face of the rear cover 100.

The pressure plate 120 is formed in the shape of which outer edge fits between these guide frames 101, 102 and has a thickness set such that this pressure plate 120 can move between the inner face of the rear cover 100 and each of the restricting claws 101a, 101b, 102a, 102b. The corner formed by the winding spool side edge 121 (which would be located in the vicinity of the film winding spool of an unillustrated camera body at the time when the rear cover 100 is closed) (a right-hand end edge of FIG. 8) and the lower edge 122 of this pressure plate 120 is cut in a rectangular shape to arrange the photo reflector 150.

The pressure plate 120 formed in this way is inserted between the guide frames 101 and 102 from left side in FIG. 8 and between the inner face of the rear cover 100 and each of the restricting claws 110a, 101b, 102a, 102b. This pressure plate 120 comes in contact with a photo reflector unit 140 housing a photo reflector 150 and is positioned by this contact.

The pressure plate spring 130 is inserted between the rear cover 100 and the pressure plate 120 thus set each other. This pressure plate spring 130 is formed in a shape in which four leg portions 130b to 130e, a film pressing spring 130f and a fixing piece 130g are respectively extend from a central portion 130a, in advance by blanking working. The central portion 130a of the pressure plate spring 130 is closely fixed to the inner face of the rear cover 100 by a set screw 160 going through the fixing piece 130g. Each of the leg portions 130b to 130e is arranged in parallel with the film running direction 1. The leg portions 130b to 130e are arranged two by two at both of upper and lower edges of the central portion 130a. On each edge, a pair of leg portions extend in directions where they are separated from each other. These leg portions 130b to 130e are respectively bent to this side from the plane of FIG. 8 and press the pressure plate 120 against the respective restricting claws 101a, 101b, 102a, 102b or the film guide rails of an unillustrated camera body through an unillustrated film by the end tips of the leg portions, when the rear cover 100 is closed. Each of the leg portions 130b to 130e must have a sufficient length so as exert elasticity and a stroke enough to function as a spring.

However, as mentioned above, the pair of leg portions 130b, 130c and the pair of leg portions 130d, 130e are respectively arranged along the upper and lower edges of the central portion 130a of the conventional pressure plate spring 130. Accordingly, when the pressure plate 120 is cut to arrange the photo reflector 150, the length of the pressure plate 120 in the film running direction 1 is shortened, so that length of each of the leg portions 130b to 130e can not be sufficiently secured. This is a conventional first problem.

Besides, if the length of each of the two leg portions 130b to 130e arranged in the film running direction 1 is excessively secured in spite of the length of the pressure plate 120 in the film running direction 1 shortened, roots of the leg portions 130d, 130e excessively approach each other as shown in FIG. 8. As a result, a boundary portion 130h between these leg portions 130d, 103e and the central portion 130a of the pressure plate 130 becomes excessively thin so that strength of the pressure plate spring 130 itself is reduced. This is a conventional second problem.

SUMMARY OF THE INVENTION

In consideration of the conventional first problem, a first object of the present invention is to provide a pressure plate spring which can be secured with a sufficient length of each leg portion and which can press a pressure plate with predetermined stroke and predetermined elasticity even if the pressure plate has a small size in a film running direction.

In consideration of the conventional second problem, a second object of the present invention is to provide a pressure plate spring which can be secured with sufficient lengths of four leg portions and which can press a pressure plate with predetermined stroke and predetermined elasticity at four corners of the pressure plate without reducing an entire strength thereof even if the pressure plate has a small size in a film running direction.

In accordance with a first aspect of the present invention, to solve the above first object, a pressure plate spring integrally has four spring legs for biasing a pressure plate provided inside a rear cover of a camera in a direction separated from the rear cover. Each of the spring legs is arranged in directions perpendicular to the other adjacent spring legs. In such a construction, no respective spring legs interfere with the other spring legs even if lengths of the respective spring legs are increased to sufficiently secure stroke and resilient.

In accordance with a second aspect of the present invention, to solve the above second object, extending directions of the respective spring legs from their root toward their free ends are directed along a same rotating direction seen from a center of said pressure plate spring. In such a construction, no roots of the respective spring legs are adjacent to those of any other spring legs, so that no strength of the entire pressure plate spring is reduced Further, since end tips of the spring legs respectively press approximately four corners of the pressure plate, the entire pressure plate can- be pressed by an approximately even biasing force.

In accordance with a third aspect of the present invention, to solve the above first object, a pressure plate spring integrally has four spring legs for biasing a pressure plate shaped in substantial rectangle and provided inside a rear cover of a camera in a direction separated from the rear cover. The spring legs are arranged along the four edge of the pressure plate respectively. In such a construction, no respective spring legs interfere with the other spring legs even if lengths of the respective spring legs are increased to sufficiently secure stroke and resilient.

The invention will be described below in detail with reference to the accompanying drawings, in which.

DESCRIPTION OF THE PREFERRED EMBODIMENT

The embodiment of the present invention will be described below on the basis of the drawings.

Figure 1:
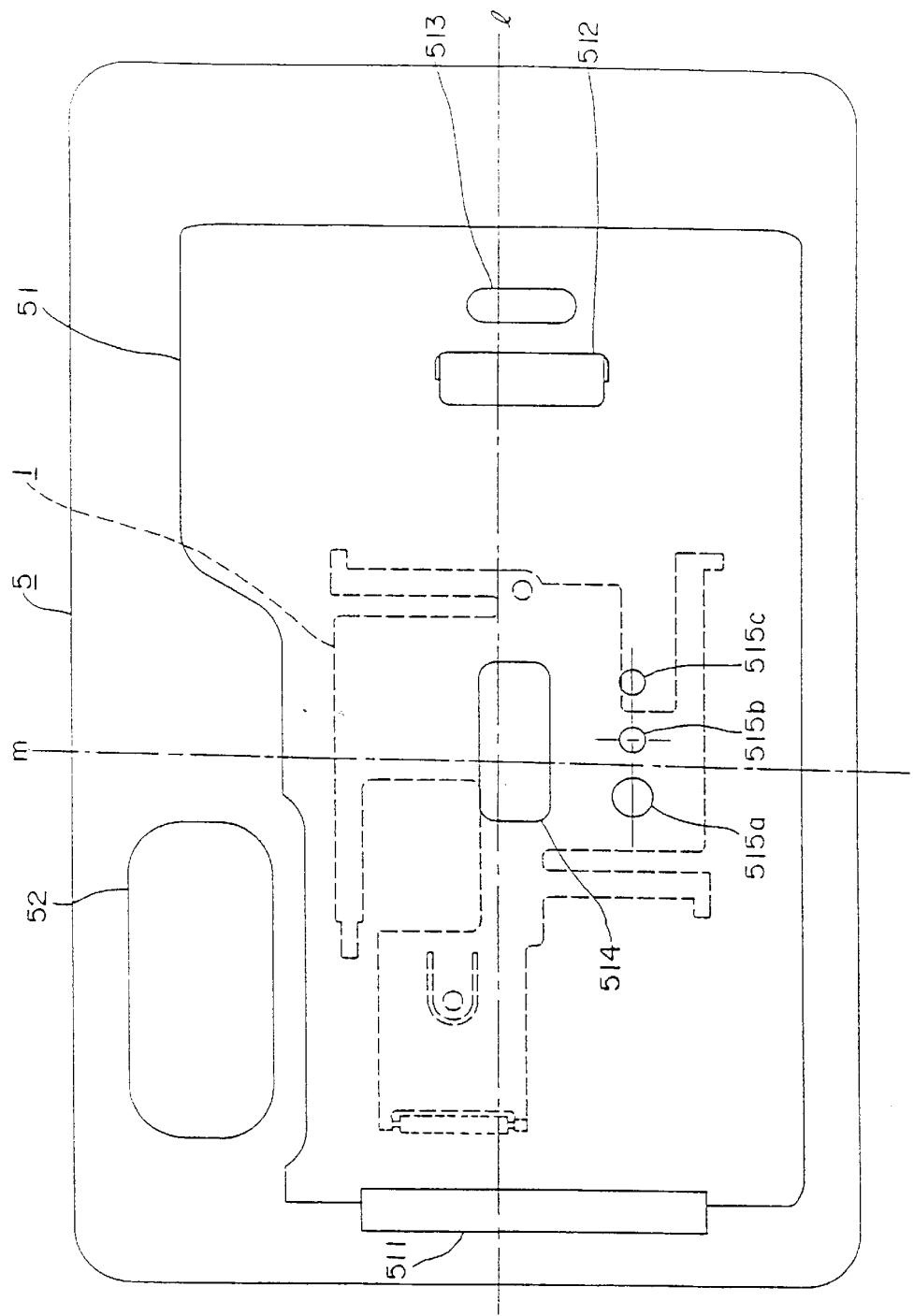
FIG. 1 is a rear view of a camera in accordance with an embodiment of the present invention.

FIG. 1 is a rear view of a camera 5 having a pressure plate spring 1 of an embodiment of the present invention. As shown in FIG. 1, a finder window 52 is arranged in the vicinity of a left shoulder of the camera 5 on its rear face. A portion except for this finder window 52 on the rear face of the camera 5 is formed as a rear cover 51 for an unillustrated film cartridge to be loaded into or taken out of the interior of the camera 5. This rear cover 51 is freely opened and closed with respect to a camera body (a portion of the camera 5 except for the rear cover 51) by a hinge 511 arranged on a left-hand side in FIG. 1. A portion of the rear cover 51 most apart from the hinge 511 covers a film cartridge chamber of the camera body, and a portion of the rear cover 51 near the hinge 511 covers a spool chamber for storing a winding spool although these portions are not shown in FIG. 1. A central portion of the rear cover 51 covers a portion near an aperture of the camera body. As is well known, film guide rails are respectively arranged at both upper and lower edges along a film running direction of the aperture of the camera body so as to correctly guide the film and to hold flatness of the film. A chain line 1 in FIG. 1 shows a running position of center of the film guided by these unillustrated film guide rails. Hereinafter, there is also a case in which this chain line 1 is called "the film running direction". A chain line m in FIG. 1 shows a line rectangular to the chain line 1 and a photographing optical axis at the center of the aperture of the unillustrated camera body. In the following explanation, an upper side of FIG. 1 is set to "up" and a lower side of FIG. 1 is set to "down".

In FIG. 1, a display panel 514 for a date module device 4 which writes a photographing date, etc. onto the film is infixed in center of the rear cover 51. Operating buttons 515a, 515b, 515c of this date module device 4 are arranged on a lower side of this display panel 514 along the film running direction 1. A lock releasing lever 513 to be operated to release an unillustrated lock mechanism of the rear cover 51 to open the rear cover 51 is arranged in the vicinity of an side edge of the rear cover 51 located opposite to the hinge 511. A film window 512 is adjacent to this lock releasing lever 513 and is seen through by a user to confirm whether the film cartridge is stored to the unillustrated cartridge chamber of the camera body or not.

Figure 2:
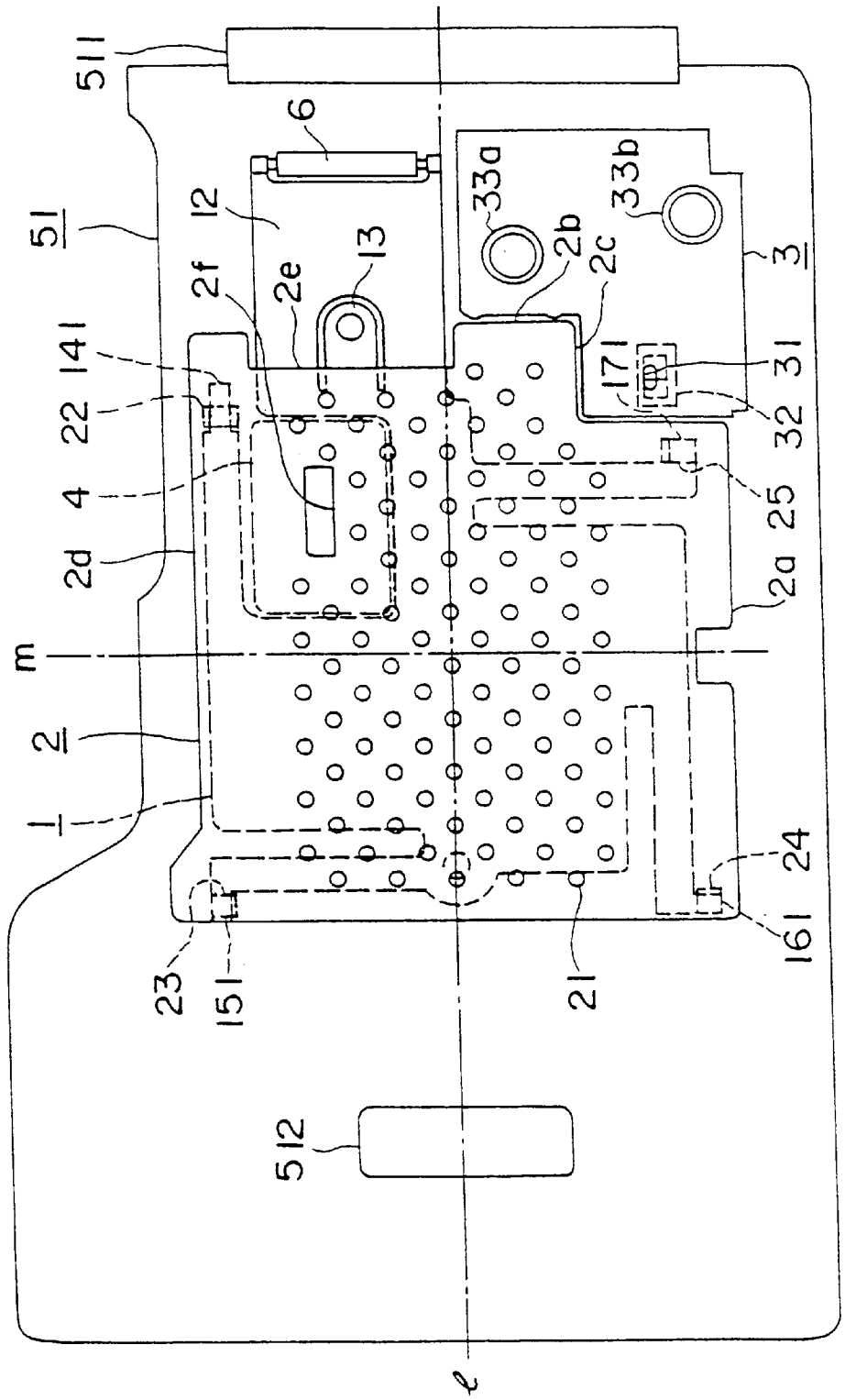
FIG. 2 is a plan view showing the inner face of the rear cover.

FIG. 2 is a plan view showing the inner face of the rear cover 51. As shown in FIG. 2, a pressure plate 2 is approximately arranged at a center of the rear cover 51 on its inner face and is supported by a pressure plate spring 1 which constantly biases the pressure plate 2 so that it may separate from the inner face of the rear cover 51. The pressure plate 2 presses the film against the film guide rails when the film is loaded in the camera body and the rear cover 51 is closed, specifically, when the film cartridge is stored into the unillustrated cartridge chamber and the film pulled out of the film cartridge is guided onto the unillustrated film guide rails and an end tip of the film is wound around the winding spool and the rear cover 51 is closed.

This pressure plate 2 is constructed as a plastic plate having a width in a direction of the chain line m wider than the distance between the unillustrated film guide rails of the camera body and having a length in a direction of the chain line 1 longer than a width of the unillustrated aperture of the camera body. A surface of the pressure plate 2 which comes in contact with the film is made as a smooth flat face. Many small projections 21 for preventing close contact with the film are formed in a portion of the pressure plate 2 coming in contact with the film. A first notch 2c is formed in a rectangular shape at the lower right corner formed by a winding spool side edge 2b, that is, a right side edge in FIG. 2 and a lower edge 2a of the pressure plate 2. A second notch 2e is also formed in a rectangular shape on the winding spool side edge 2b between an upper edge 2d and the first notch 2c. The second notch 2e is shallower than the first notch 2c. In other words, the second notch 2e is narrower in notch width than the first notch 2c in the direction of the chain line 1. Further, a rectangular through hole 2f is formed in the vicinity of the upper right corner of the pressure plate 2. A position of this through hole 2f is overlapped with a corner of the aperture of the camera body, that is, the upper left corner in FIG. 1 when the rear cover 51 is closed.

The date module device 4 is mounted on the inner face of the rear cover 51 behind the through hole 2f. A light emitting segment which writes information of a date, etc. onto the film through this through hole 2f is arranged at a position on the date module device 4 overlapped with the through hole 2f.

The first notch 2c and the winding spool side edge 2b (except for a section from the second notch 2e to the upper edge 2d) of the pressure plate 2 are fitted to a side face of the photo reflector unit 3. This photo reflector unit 3 is a device for optically detecting the passage of a film perforation. Namely, a through hole 31 is formed on a plan surface of a part of the photo reflector unit 3 fitted into the first notch 2c of the pressure plate 2. More concretely, the through hole 31 is formed at a position which is overlapped with the film perforation when the film is loaded in the camera body and the rear cover 51 is closed. A photo reflector 32 in which a light emitting plane of a light emitting diode and a light receiving plane of a photo diode are arranged side by side is attached behind the through hole 31 in a state in which the light emitting plane and the light receiving plane faces the through hole 31. The photo diode receives light which is emitted from the light emitting diode and reflected by the film, through its light receiving plane. Existence or nonexistence of the film perforation is detected on the basis of whether the received light amount (in other word, reflectivity) exceeds a threshold level. As a result, a passing amount of the perforation, i.e., a running amount of the film is detected on the basis of a pulse-shaped change of the received light amount. Reference numerals 33a, 33b in FIG. 2 designate set screws for fixing the photo reflector unit 3 to the rear cover 51.

Figure 3:
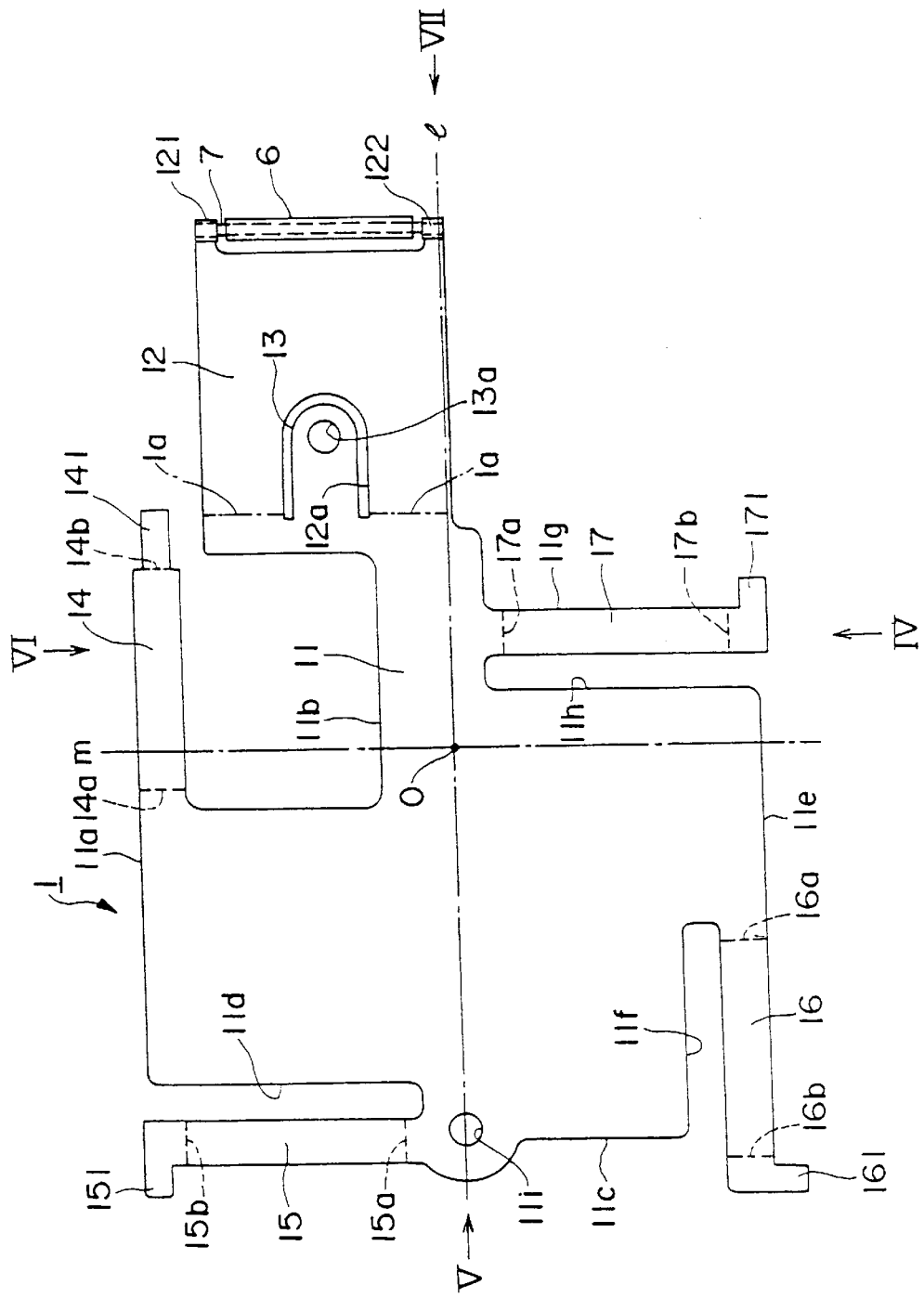
FIG. 3 is a plan view of the pressure plate spring.

The structure of the pressure plate spring 1 will next be explained with reference to FIGS. 3 to 7. This pressure plate spring 1 is integrally formed by blanking a metallic plate. FIG. 3 is a plan view of the pressure plate spring 1 seen from the same direction as FIG. 2. Meanings of the respective chain lines 1 and m in FIG. 3 are similar to those in FIG. 2.

Figure 4:
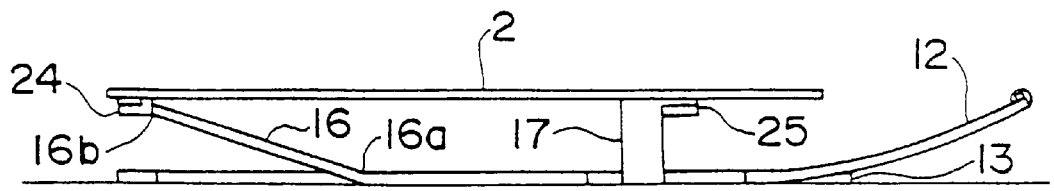
FIG. 4 is a side view of the pressure plate spring seen from the direction of an arrow IV in FIG. 3.

The pressure plate spring 1 is entirely formed approximately in an inverse L-shape. A portion of the pressure plate spring 1 which is on upper side of the chain line 1 in FIG. 3 and which is on right side of the dotted line 1a and extends toward the winding spool side is gradatim bent to this side from the plane of FIG. 3, as illustrated in FIG. 4 which shows the pressure plate spring 1 and the pressure plate 2 seen from the direction of an arrow IV in FIG. 3. This extending portion functions as a "film pressing portion 12". The end edge of the film pressing portion 12 is cut in a fork shape. Each of the forked end tips is folded in a sleeve shape parallel to the chain line m, whereby the tips functions as roll bearings 121, 122. A roller 6 is arranged between the roll bearings 121 and 122 and is rotatably held by a shaft 7 fixed to the roll bearings 121, 122 at both ends thereof. This roller 6 is used to press the film against the winding spool to wind the film around the winding spool when the film is loaded in the camera body and the rear cover 51 is closed. This film pressing portion 12 has a width slightly narrower than that of the second notch 2e of the pressure plate 2.

A U-shaped slit 12a is formed at the root of the film pressing portion 12 and is directed in a direction parallel to the chain line 1 such that both ends of the slit 12a come in contact with a dotted line 1a. A tongue piece left inside the slit 12a having a semicircular shape at its end tip functions as a "fixing piece 13", which is used to fix the pressure plate spring 1 onto the inner face of the rear cover 51. For that reason, a screw hole 13a is formed at the end tip of the fixing piece 13 through which a fixing screw is inserted for fixing the pressure plate spring 1 to the rear cover 51.

A portion of the pressure plate spring 1 which is on left side of the dotted line 1a is entirely formed in an approximately square shape. This portion comes in close contact with the inner face of the rear cover 51 and is hereinafter called a "flat plate portion 11".

Figure 6:
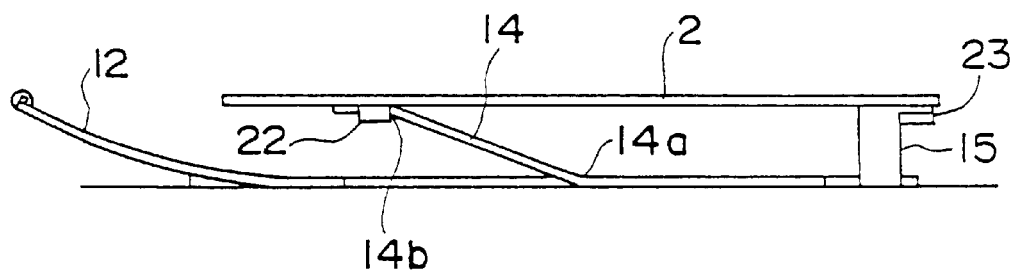
FIG. 6 is a side view of the pressure plate spring seen from the direction of an arrow VI in FIG. 3.

A rectangular notch 11b for storing the date module device 4 is formed in an upper right portion of the flat plate portion 11 in a manner it extends from an upper right corner of the flat plate portion 11 toward a portion near the center O, that is, the intersecting point of the chain lines m and 1, with slight widths respectively left between the notch 11b and each of the dotted line 1a, the chain line 1 and an upper edge 11a of the flat plate portion 11. A length of the notch 11b in the direction of the chain line 1 is slightly shorter than half length of the entire flat plate portion 11 in the direction of the chain line 1. The portion between the notch 11b and the upper edge 11a of the flat plate portion 11 is formed as a "first spring leg 14". This first spring leg 14 is bent to this side from the plane of FIG. 3 at its root (dotted line 14a), as illustrated in FIG. 6 which shows the pressure plate spring 1 and the pressure plate 2 seen from the direction of an arrow VI in FIG. 3. A first hook 141 is integrally formed at an end tip of the first spring leg 14 and has a width slightly narrower than that of the first spring leg 14. This first hook 141 is bent at its root (dotted line 14b) so as to be parallel with a plane of the flat plate portion 11.

Figure 5:
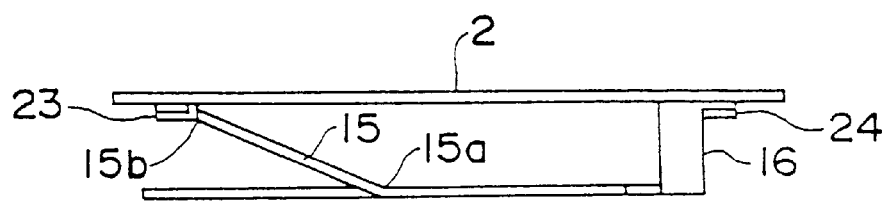
FIG. 5 is a side view of the pressure plate spring seen from the direction of an arrow V in FIG. 3.

A slit 11d is formed in an upper left portion of the flat plate portion 11 in parallel with the chain line m in a manner it extends from the upper edge 11a toward the chain line 1, with a slight width left between the slit 11d and a cartridge chamber side edge 11c of the flat plate portion 11. (The edge 11c is one closest to the unillustrated cartridge chamber of the camera body when the rear cover 51 is closed.) The slit 11d has a length slightly shorter than half length of the entire flat plate portion 11 in the direction of the chain line m. The portion between the slit 11d and the cartridge chamber side edge 11c is formed as a "second spring leg 15". This second spring leg 15 is bent to this side from the plane of FIG. 3 at its root (dotted line 15a), as illustrated in FIG. 5 which shows the pressure plate spring 1 and the pressure plate 2 seen from the direction of an arrow V in FIG. 3. A second hook 151 having a width slightly narrower than that of the second spring leg 15 is integrally formed at an end tip of this second spring leg 15 and outwardly curved at right angles in a key shape. The end tip portion of the second spring leg 15 is bent at the dotted line 15b so that the second hook 151 may be parallel with the plane of the flat plate portion 11.

A slit 11f is formed in a lower left portion of the flat plate portion 11 in parallel with the chain line 1 in a manner it extends from the cartridge chamber side edge 11c toward the chain line m, with a slight width left between the slit 11f and the lower edge 11e of the flat portion 11. This slit 11f has a length slightly shorter than half length of the entire flat plate portion 11 in the direction of the chain line 1. The portion between the slit 11f and the lower edge 11e is formed as a "third spring leg 16". As shown in FIG. 4, this third spring leg 16 is bent to this side from the plane of FIG. 3 at its root (dotted line 16a). A third hook 161 having a width slightly narrower than that of the second spring leg 16 is integrally formed at an end tip of this third spring leg 16 and outwardly curved at right angles in a key shape. The end tip portion of the third spring leg 16 is bent at the dotted line 16b so that the third hook 161 may be parallel with the plane of the flat plate portion 11.

Figure 7:
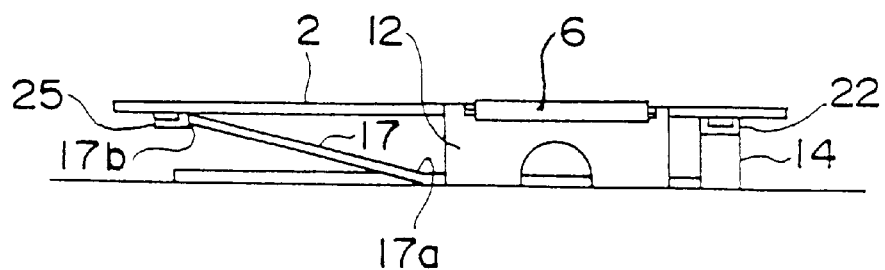
FIG. 7 is a side view of the pressure plate spring seen from the direction of an arrow VII in FIG. 3.
Figure 8:
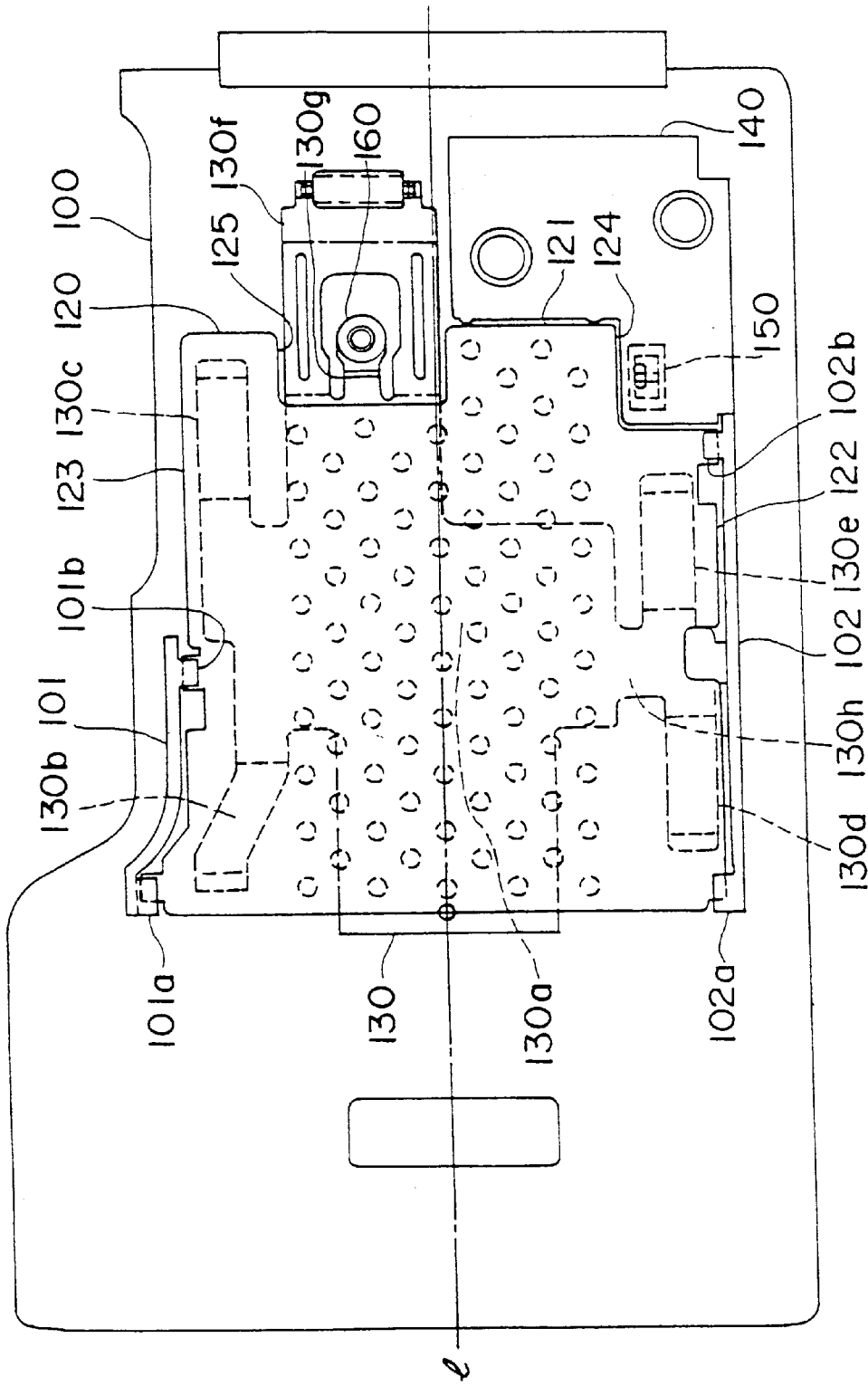
FIG. 8 is a plan view showing a conventional pressure plate spring.

A winding spool side edge 11g of the flat plate portion 11 is shifted on a lower side of the chain line 1 from the boundary line (dotted line 1a) of the flat plate portion 11 and the film pressing portion 12 toward the center O. A slit 11h parallel with the chain line m is formed, extending from the lower edge 11e toward the chain line 1, with a slight width left between the winding spool side edge 11g and the slit 11h. This slit 11h has a length slightly shorter than half length of the entire flat plate portion 11 in the direction of the chain line m. The portion between the winding spool side edge 11g and the slit 11h is formed as a "fourth spring leg 17". As illustrated in FIG. 7 which shows the pressure plate spring 1 and the pressure plate 2 seen from the direction of an arrow VII in FIG. 3, this fourth spring leg 17 is bent to this side from the plane of FIG. 3 at its root (dotted line 17a).

A fourth hook 171 having a width slightly narrower than that of the fourth spring leg 17 is integrally formed at an end tip of the fourth spring leg 17 and outwardly curved at right angles in a key shape. The end tip portion of the fourth spring leg 17 is bent at dotted line 17b so that the fourth hook 171 may be parallel with the plane of the flat plate portion 11.

As mentioned above, the respective spring legs 14 to 17 are arranged in directions perpendicular to the other adjacent spring legs. Extending directions of the respective spring legs 14 to 17 from their root toward their free ends at which the respective hooks 141 to 171 are formed are directed along a clockwise direction seen from the center O in FIG. 3. Namely, the first spring leg 14 and the third spring leg 16 are parallel with each other, while their respective free ends are directed in reverse directions. Similarly, the second spring leg 15 and the fourth spring leg 17 which are arranged in directions perpendicular to the first spring leg 14 and the third spring leg 16 are parallel to each other. The respective free ends of these second and fourth spring legs are directed in reverse directions.

A screw hole 11i is formed in the vicinity of an intersection point of the chain line 1 and the cartridge chamber side end edge 11c of the flat plate portion 11. A fixing screw for fixing the pressure plate spring 1 to the rear cover 51 is inserted into the screw hole 11i.

As shown in FIG. 2 and FIGS. 4 to 7, hook engaging portions 22, 23, 24, 25 engaged with respective hooks 141, 151, 161, 171 of the pressure plate spring 1 are respectively integrally formed on a rear face (a face facing the rear cover 51) of the pressure plate 2 at portions coming in contact with the respective hooks 141, 151, 161, 171 in free states. Particularly, the first hook engaging portion 22 has a shape of bridge and forms a through hole into which the first hook 141 is inserted in a direction parallel with the chain line 1. The first hook engaging portion 22 restricts a shift of the pressure plate 2 in the direction of the chain line m that is upward and downward directions in FIG. 2. The second hook engaging portion 23 forms a clearance into which the second hook 151 is inserted in a direction parallel with the chain line 1. However, different from the first hook engaging portion 22, the second hook engaging portion 23 is formed in the shape of a key opened on a side adjacent to the upper edge 2d. The second hook engaging portion 23 restricts a downward shift of the pressure plate 2 in the direction of the chain line m and a leftward shift of the pressure plate 2 in the direction of the chain line 1. The third hook engaging portion 24 forms a clearance into which the third hook 161 is inserted in a direction parallel with the chain line m. The third hook engaging portion 24 is formed in the shape of a key shape opened on a side adjacent to the cartridge chamber side edge 11e. The third hook engaging portion 24 restricts a rightward shift of the pressure plate 2 in the direction of the chain line 1 and a downward shift of the pressure plate 2 in the direction of the chain line m. The fourth hook engaging portion 25 forms a clearance into which the fourth hook 171 is inserted in a direction parallel with the chain line 1. The fourth hook engaging portion 25 is formed in the shape of a key opened on a side adjacent to the lower edge 2a. The fourth hook engaging portion 25 restricts an upward shift of the pressure plate 2 in the direction of the chain line m and a rightward shift of the pressure plate 2 in the direction of the chain line 1.

Thus, the respective engagements of the hooks 141, 151, 161, 171 with the hook engaging portions 22, 23, 24, 25 prevent the pressure plate 2 from dropping from the pressure plate spring 1 and from shifting in all directions parallel with the inner face of the rear cover 51. The second hook engaging portion 23, the third hook engaging portion 24 and the fourth hook engaging portion 25 are respectively engaged with the hooks 151, 161, 171 in the shape of a key from root sides of the respective spring legs 15, 16, 17 and, therefore, allow movements of the respective hooks 151, 161, 171 toward end tip sides of the respective spring legs 15, 16, 17. This is because sliding movements of the respective hooks 151, 161, 171 with respect to the pressure plate 2 can be escaped when the pressure plate 2 is pressed toward the rear cover 51 and the respective tip ends of the spring legs 15, 16, 17 spread. On the contrary, the reason why the first hook engaging portion 22 is in the shape of a bridge is to restrict rotation of the pressure plate 2 in the clockwise direction in FIG. 2.

When the camera having the above-explained structure is assembled, each of the date module 4 and the photo reflector unit 3 is first fixed to the inner face of the rear cover 51. Next, the pressure plate spring 1 is lapped over the inner face of the rear cover 51 and is aligned in position such that the date module 4 is fitted into the notch 11b. Then, set screws are respectively screwed into the screw holes 13a, 11i of the pressure plate spring 1 to fix the pressure plate spring 1 to the inner face of the rear cover 51.

Next, the first hook 141 of the pressure plate spring 1 is engaged with the first hook engaging portion 22 of the pressure plate 2. The third hook 161 is engaged with the third hook engaging portion 24. The fourth hook 171 is engaged with the fourth hook engaging portion 25. Then, while the second spring leg 15 of the pressure plate spring 1 is resiliently twisted toward the winding spool side, the second hook 151 is engaged with the second hook engaging portion 23 of the pressure plate 2. Thus, the four spring legs 14 to 17 of the pressure plate spring 1 support four corners of the pressure plate 2. In this state, the through hole 2f of the pressure plate 2 faces a light emitting portion of the date module 4, the first notch 2c and the winding spool side edge 2b of the pressure plate 2 come in contact with a side wall of the photo reflector unit 3, and the second notch 2e of the pressure plate 2 and the film pressing portion 12 of the pressure plate spring 1 are overlapped with each other. The pressure plate spring 1 may be set by such a easy way that the pressure plate spring 1 is rotated in counter clockwise direction on the rear face of the pressure plate 2 so as to engage the second through fourth hooks 151, 161, 161 with the first through fourth hook engaging portion 23, 24, 25 respectively, and thereafter the first hook 141 is inserted to the first hook engaging portion 22 while the first spring leg 14 bent resiliently.

Finally, the rear cover 51 is connected to the camera body through the hinge 511. Thus, the assembly of the camera is completed.

When this camera is used, a film cartridge is inserted into an unillustrated cartridge chamber of the camera body while the rear cover 51 is opened. A film is then pulled out of the film cartridge by a slight amount. The rear cover 51 is closed after an end tip of the film is overlapped with an unillustrated winding spool of the camera body. Then, one portion of the pressure plate 2 comes in contact with one portion of a film guide rail over the film. When the rear cover 51 is completely closed, the pressure plate 2 is pressed toward the rear cover 51 against resilience of the pressure plate spring 1 and the pressure plate 2 presses the film against the film guide rail as that's reaction. Simultaneously, the film pressing portion 12 is curved toward the rear cover 51 while pressing the roller 6 against the winding spool over the film.

On the other hand, when the rear cover 51 is opened, the pressure plate 2 is greatly floated upward from the rear cover 51, since lengths of the respective spring legs 14 to 17 of the pressure plate spring 1 are sufficiently secured to provide enough resilient force to each of these spring legs. Accordingly, if only a lock mechanism of the rear cover 51 is released through an operation of a lock releasing lever 513, the rear cover 51 is moved by the pressure plate spring 3 in an opening direction, so that the rear cover 51 is easily opened.

As explained above, the pressure plate spring 1 in this embodiment has a construction for supporting portions near four corners of the pressure plate 2 at end tips of the four spring legs 14 to 17. However, the lengths of the respective spring legs 14 to 17 can be sufficiently secured in spite of the notch 2c for arranging the photo reflector unit 3 formed. Accordingly, it is possible to secure required resilience and stroke without reducing strength of the entire pressure plate spring 1.

In accordance with the present invention, the lengths of the respective leg portions can be sufficiently secured even if the pressure plate has a small size in the film running direction. Accordingly, the pressure plate can be pressed with predetermined stroke and predetermined resilience. Further, if portions of the respective spring legs extending toward their free ends are directed along a same rotating direction seen from a center of the pressure plate spring, the lengths of the four leg portions can be sufficiently secured without reducing the entire strength even if the pressure plate has a small size in the film running direction.

This invention being thus described, it will be obvious that same may be varied in various ways. Such variations are not to be regarded as departure from the spirit and scope of the invention, and all such modification would be obvious for one skilled in the art intended to be included within the scope of the following claims.

We claim:

1. A pressure plate spring integrally having four spring legs for biasing a pressure plate provided inside a rear cover of a camera in a direction separated from the rear cover, wherein each of said spring legs is arranged in directions perpendicular to the other adjacent spring legs.

2. The pressure plate spring as claimed in claim 1, wherein two opposed spring legs among said four spring legs are arranged in parallel with each other; and wherein the other two spring legs are arranged in directions perpendicular to these two opposed spring legs.

3. The pressure plate spring as claimed in claim 2, wherein the two spring legs arranged in parallel with each other are arranged such that free ends of these two spring legs are directed in directions reverse to each other.

4. The pressure plate spring as claimed in claim 3, wherein free ends of said four spring legs respectively come in contact with four corners of said pressure plate.

5. The pressure plate spring as claimed in claim 3, wherein free ends of said four spring legs respectively support four corners of said pressure plate.

6. The pressure plate spring as claimed in claim 1, wherein extending directions of said respective spring legs from their root toward their free ends are directed along a same rotating direction seen from a center of said pressure plate spring.

7. A pressure plate spring integrally having four spring legs for biasing a pressure plate shaped in substantial rectangle and provided inside a rear cover of a camera in a direction separated from the rear cover, wherein said spring legs are arranged along the four edge of the pressure plate respectively.

* * * * *